United States Patent [19]
Koo et al.

[11] Patent Number: 5,949,568
[45] Date of Patent: Sep. 7, 1999

[54] ARRAY OF THIN FILM ACTUATED MIRRORS HAVING A LEVELLING MEMBER

[75] Inventors: Myung-Kwon Koo; Joon-Mo Nam, both of Seoul, Rep. of Korea

[73] Assignee: Daewoo Electronics Co., Ltd., Seoul, Rep. of Korea

[21] Appl. No.: 08/984,328

[22] Filed: Dec. 3, 1997

[30] Foreign Application Priority Data

Dec. 30, 1996 [KR] Rep. of Korea ...................... 96-77169
Dec. 30, 1996 [KR] Rep. of Korea ...................... 96-77176

[51] Int. Cl.⁶ .............................. G02B 26/08; G02B 5/08
[52] U.S. Cl. ......................... 359/224; 359/291; 359/846; 359/849
[58] Field of Search ................................... 359/224, 291, 359/846, 849, 872, 875

[56] References Cited

U.S. PATENT DOCUMENTS

| | | | |
|---|---|---|---|
| 5,579,179 | 11/1996 | Ji et al. | 359/291 |
| 5,585,956 | 12/1996 | Lee et al. | 359/291 |
| 5,606,452 | 2/1997 | Min | 359/291 |
| 5,677,785 | 10/1997 | Koo et al. | 359/291 |
| 5,706,122 | 1/1998 | Lim | 359/291 |
| 5,708,524 | 1/1998 | Min | 359/291 |
| 5,754,330 | 5/1998 | Nam | 359/224 |
| 5,754,331 | 5/1998 | Min | 359/224 |
| 5,757,539 | 5/1998 | Min | 359/224 |
| 5,760,947 | 6/1998 | Kim et al. | 359/291 |
| 5,768,006 | 6/1998 | Min et al. | 359/291 |
| 5,774,256 | 6/1998 | Min et al. | 359/291 |
| 5,815,305 | 9/1998 | Min et al. | 359/224 |
| 5,835,293 | 11/1998 | Min et al. | 359/224 |

*Primary Examiner*—Georgia Epps
*Assistant Examiner*—Evelyn A. Lester
*Attorney, Agent, or Firm*—Pennie & Edmonds LLP

[57] ABSTRACT

An inventive array of M×N thin film actuated mirrors includes an active matrix, a passivation layer, an etchant stopping layer, and an array of M×N actuating structures. Each of the active matrix includes a substrate, an array of M×N MOS transistors, M number of source lines, N number of gate lines, an array of M×N connecting terminals and an array of M×N levelling members, top of the levelling member being at a same level as that of the connecting terminal. Each of the actuating structures includes a first thin film electrode, an thin film electrodisplacive layer, an elastic layer and a conduit, and has a proximal end and a distal end, the proximal end being divided into a first and a second side portions, wherein the first side portion of the proximal end is located on top of the connecting terminal in the active matrix and the second side portion of the proximal end is located on top of the levelling member in the active matrix.

8 Claims, 9 Drawing Sheets

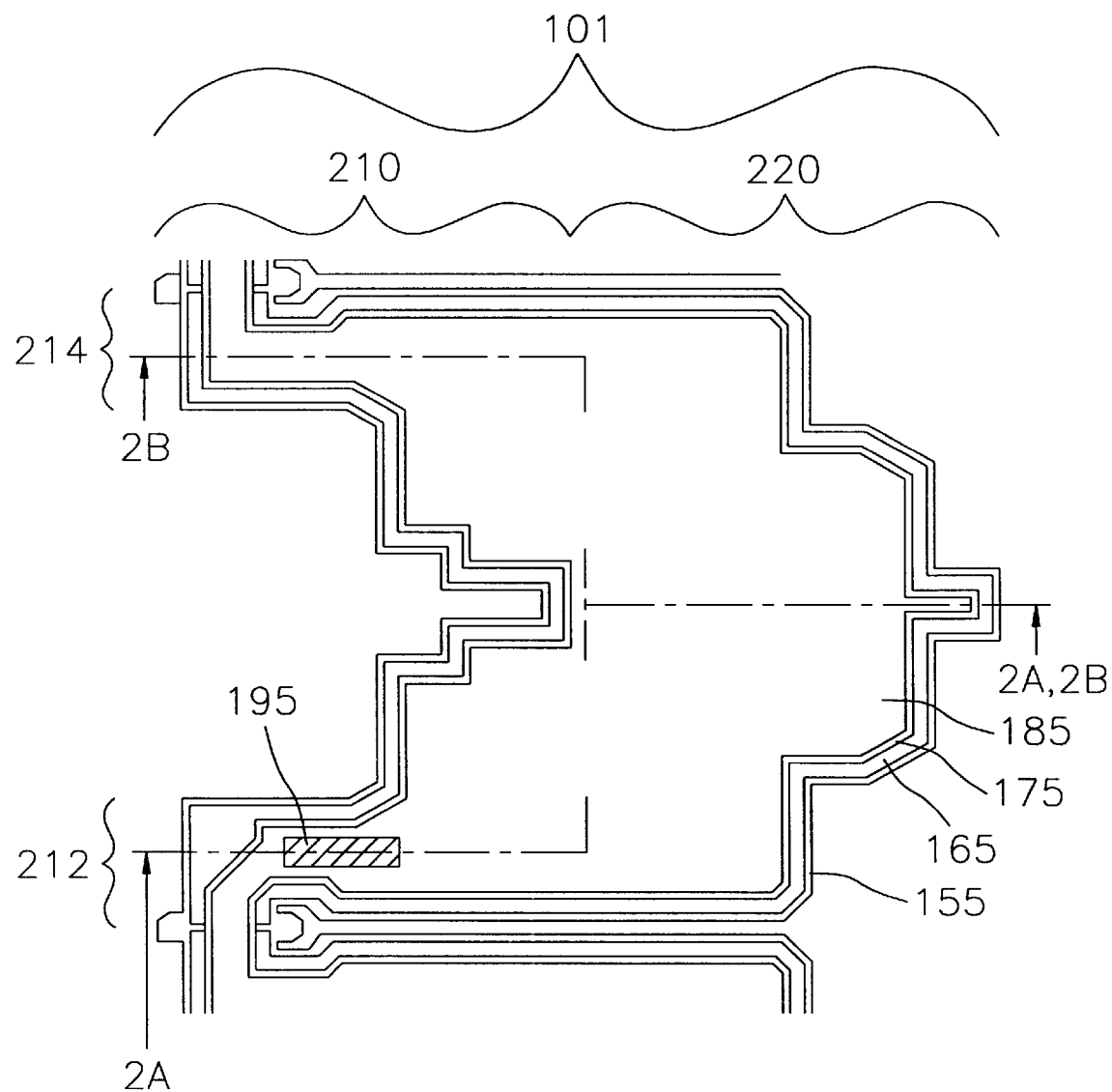

ARRAY OF THIN FILM ACTUATED MIRRORS HAVING A LEVELLING MEMBER

FIELD OF THE INVENTION

The present invention relates to an array of M×N thin film actuated mirrors for use in an optical projection system; and, more particularly, to each of the thin film actuated mirrors having a levelling member.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is a top view setting forth an array 100 of M×N thin film actuated mirrors 101, wherein M and N are integers, for use in an optical projection system, disclosed in a copending commonly owned application, U.S. Ser. No. 08/602,928, entitled "THIN FILM ACTUATED MIRROR ARRAY FOR USE IN AN OPTICAL PROJECTION SYSTEM".

In FIGS. 2A and 2B, there are provided with schematic cross sectional views taken along lines 2A—2A and taken along lines 2B—2B in FIG. 1, respectively.

The array 100 includes an active matrix 110, a passivation layer 120, an etchant stopping layer 130 and an array of M×N actuating structures 200.

The active matrix 110 includes a substrate 112, an array of M×N transistors (not shown) and an array of M×N connecting terminals 114.

The passivation layer 120, made of, e.g., a phosphorsilicate glass (PSG) or silicon nitride, and having a thickness of 0.1–2 μm, is located on top of the active matrix 110.

The etchant stopping layer 130, made of silicon nitride, and having a thickness of 0.1–2 μm, is positioned on top of the passivation layer 120.

Each of the actuating structures 200 is provided with a first thin film electrode 185, a thin film electrodisplacive member 175, a second thin film electrode 165, an elastic member 155 and a conduit 195. The first thin film electrode 185 made of an electrically conducting and light reflecting material is located on top of the thin film electrodisplacive member 175 and is electrically connected to ground, thereby functioning as a mirror as well as a common bias electrode. The thin film electrodisplacive member 175 made of a piezoelectric material or an electrostrictive material is placed on top of the second thin film electrode 165. The second thin film electrode 165 made of an electrically conducting material is located on top of the elastic member 155, is electrically connected to a corresponding transistor through the conduit 195 and the connecting terminal 114, and is disconnected electrically from the second thin film electrode 165 in other thin film actuated mirrors 101, thereby allowing it to function as a signal electrode. The elastic member 155, made of a nitride, is positioned below the second thin film electrode 165. The conduit 195, made of a metal, extends from top of the thin film electrodisplacive member 175 to top of a corresponding connecting terminal 114. The conduit 195 extending downward from top of the thin film electrodisplacive member 175 and the first thin film electrode 185 placed on top of the thin film electrodisplacive member 175 in each of the thin film actuated mirrors 101 are not electrically connected to each other. Each of the actuating structures 200 has a proximal end 210 and a distal end 220, the proximal end being divided into a first and second side portions 212, 214. A bottom portion at the proximal 210 end thereof is attached to top of the active matrix 110, with the etchant stopping 130 and the passivation layers 120 partially intervening therebetween, thereby cantilevering the actuating structure 200.

There are certain deficiencies associated with the above described the array 100 of M×N thin film actuated mirrors 101. Since a bottom portion at the proximal end 210 in each of the actuating structures 200 is attached to top of the active matrix 110 in order to cantilever the actuating structure and each of the connecting terminals 114 of the active matrix 110 is located below the first side portion 212 of the proximal end 210, the top of the first side portion 212 in the proximal end 210 is different from that of the second side portion 214 in the proximal end 210 thereof in such a way that the actuating structure 200 becomes slanted.

SUMMARY OF THE INVENTION

It is, therefore, one object of the present invention to provide with an array of M×N thin film actuated mirrors, wherein M and N are integers, for use in an optical projection system, each of the thin film actuated mirrors having a levelling member.

It is another object of the present invention to provide with a method for manufacturing an array of M×N thin film actuated mirrors.

In accordance with one aspect of the present invention, there is provided with an array of M×N thin film actuated mirrors, wherein M and N are integers, for use in an optical projection system, the array comprising: an active matrix including a substrate, an array of M×N MOS transistors, M number of source lines, N number of gate lines, an array of M×N connecting terminals and an array of M×N levelling members, wherein each of the transistors has a source, a gate and a drain terminals, each of the source terminals positioned in the same column being electrically connected to each other through one of the source lines, each of the gate terminals positioned in the same row being electrically connected to each other through the gate lines, each of the drain terminals being electrically connected to a corresponding connecting terminal, and the top of the levelling member is at a same level as that of the connecting terminal; a passivation layer formed on top of the active matrix; an etchant stopping layer formed on top of the passivation layer; and an array of M×N actuating structures, each of actuating structures including a first electrode, an electrodisplacive member, a second electrode, an elastic member and a conduit, wherein the first electrode is located on top of the electrodisplacive member and is electrically connected to ground thereby functioning as a mirror as well as a common bias electrode, the electrodisplacive member is positioned on top of the second electrode, the second electrode is located on top of the elastic member and is electrically connected to a corresponding transistor through the conduit and the connecting terminal, thereby functioning as a signal electrode, the elastic member is positioned at bottom of the second electrode, and the conduit extends from top of the electrodisplacive member to top of the connecting terminal, and each of actuating structures being provided with a proximal end and a distal end, the proximal end being divided into a first and a second side portions, the first side portion of the proximal end being located on top of the connecting terminal in the active matrix and the second side portion of the proximal end in the active matrix being located on top of the levelling member, with the etchant stopping layer and the passivation layer partially intervening therebetween, thereby cantilevering the actuating structure.

In accordance with another aspect of the present invention, there is provided with a method for manufacturing an array of M×N thin film actuated mirrors, the method comprising the steps of: preparing a substrate including an array of M×N MOS transistors and M number of source lines; depositing a metal layer on top of the substrate including the transistors; patterning the metal layer into an array of M×N levelling members, an array of M×N connecting terminals and N number of gate lines, thereby forming an active matrix; depositing a passivation layer and an etchant stopping layer on top of the active matrix; forming a sacrificial layer having an array of M×N pair of empty cavities on top of the etchant stopping layer; depositing an elastic layer and a second layer on top of the sacrificial layer, respectively; iso-cutting the second layer into an array of M×N second film electrodes; depositing an electrodisplacive layer and a first layer on top of the second electrodes, respectively, thereby forming a multiple layered structure; patterning the multiple layered structure into an array of M×N semifinished actuating structures, until the sacrificial layer is exposed, each of semifinished actuating structures including a first electrode, an electrodisplacive member, a second electrode, an elastic member; forming an array of M×N conduits from top of the electrodisplacive member to top of a corresponding connecting terminal thereby forming an array of M×N actuating structures; removing the sacrificial layer to thereby form an array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIG. 1 is provided with a top view of an array of M×N thin film actuated mirrors previously disclosed;

DETAILED DESCRIPTION OF THE PREFERRED EMBODIMENTS

Figure 2A:
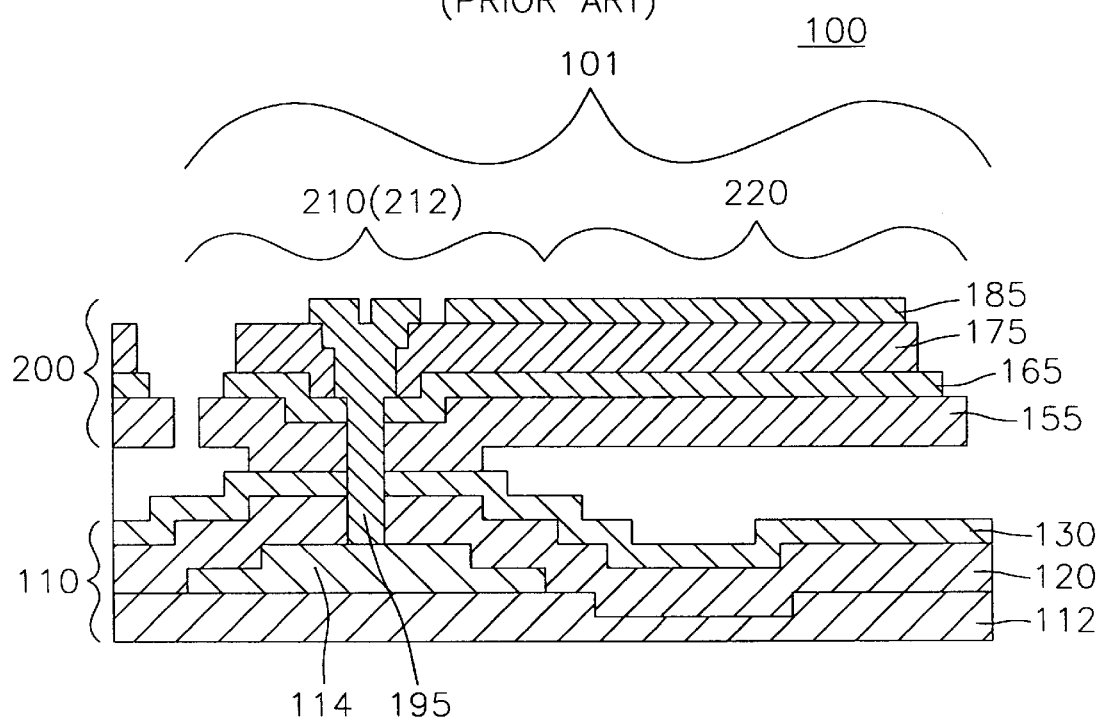
FIGS. 2A and 2B are schematic cross section views taken along lines 2A—2A taken along lines 2B—2B in FIG. 1, respectively.
Figure 2B:
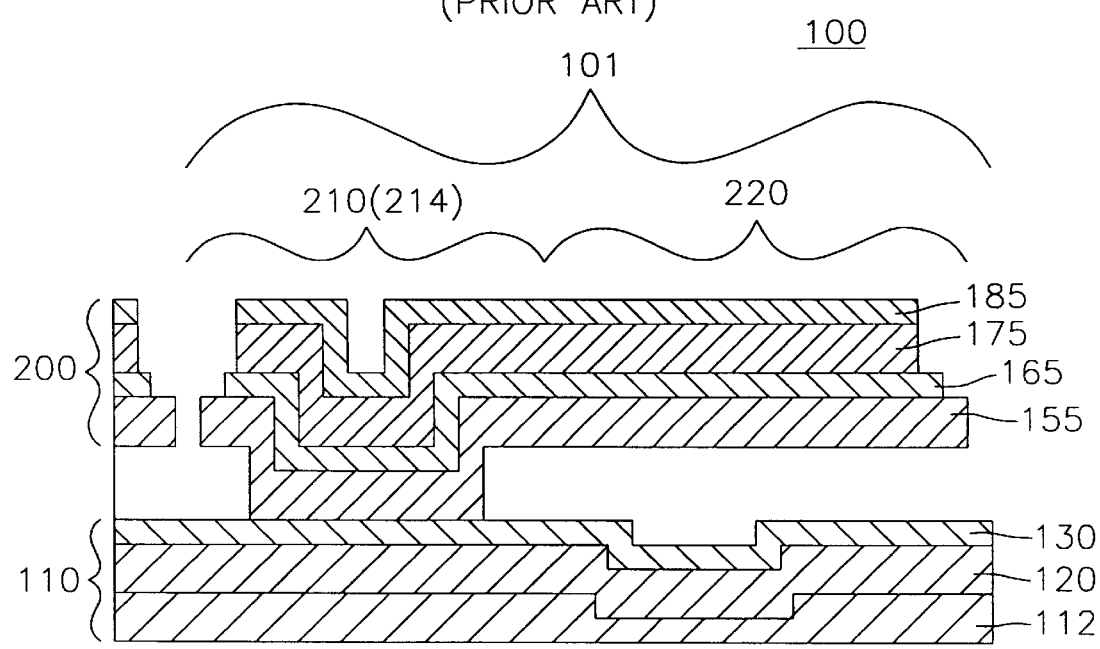

There are provided in FIGS. 3A to 3B, 4A to 4B and 5A to 5J schematic cross section views setting forth an array 300 of M×N thin film actuated mirrors 301, top views of an active matrix 310 in the thin film actuated mirrors 301 and schematic cross sectional views illustrating a method for manufacturing the array 300 of M×N thin film actuated mirrors 301, wherein M and N are integers, for use in an optical projection system, in accordance with two embodiments of the present invention, respectively. It should be noted that like parts appearing in FIGS. 3A and 3B, 4A to 4B and 5A to 5J are represented by like reference numerals.

Figure 3A:
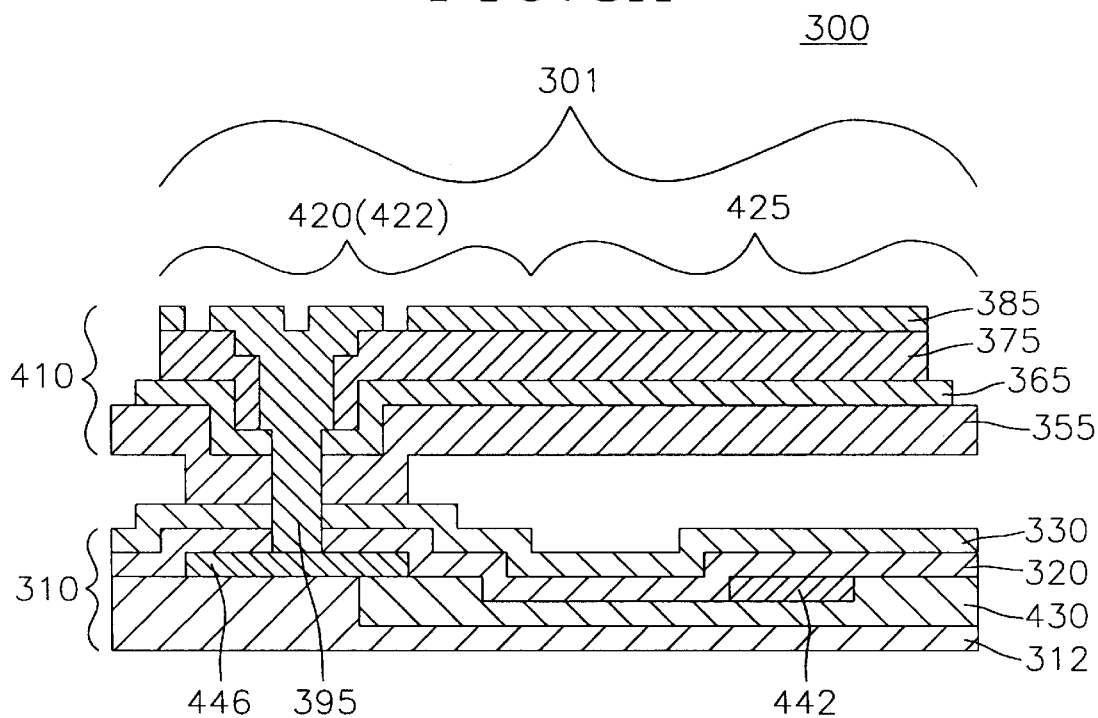
FIGS. 3A and 3B are schematic cross section views setting forth an array of M×N thin film actuated mirrors in accordance with the present invention.
Figure 3B:
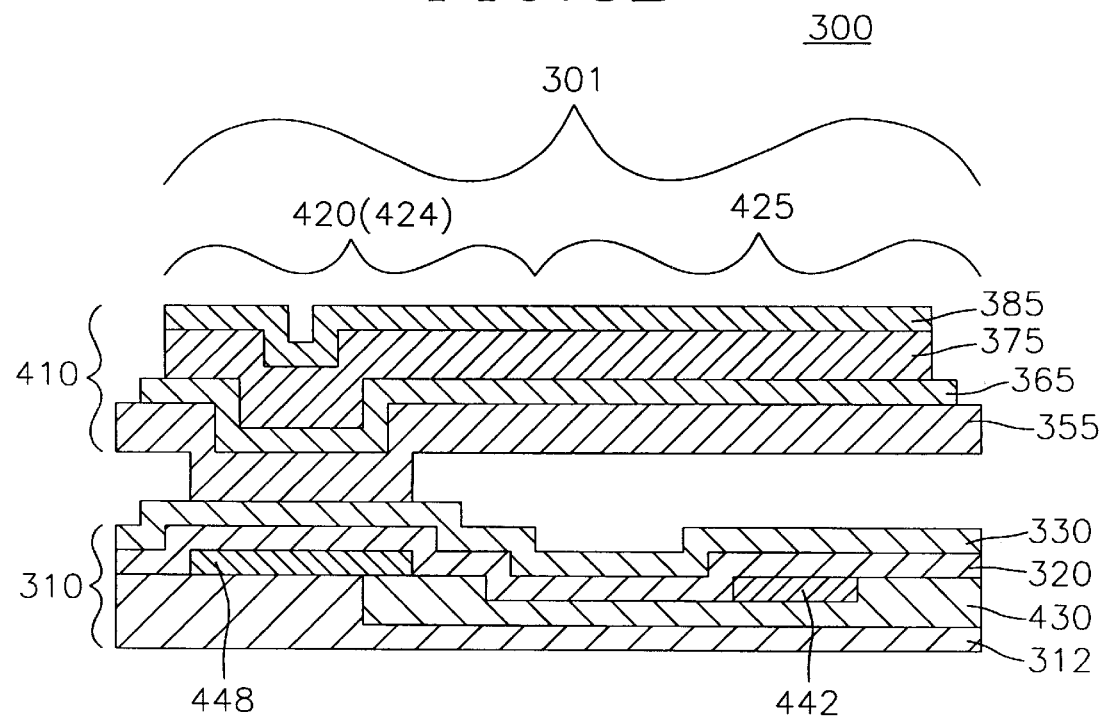

In FIGS. 3A and 3B, there are schematic cross section views setting forth an array 300 of M×N thin film actuated mirrors 301, the array 300 including an active matrix 310, a passivation layer 320, an etchant stopping layer 330 and an array of M×N actuating structures 410.

The active matrix 310 includes a substrate 312, an array of M×N MOS transistors 430, M number of source lines 442, N number of gate lines 444 (See FIGS. 4A and 4B), an array of M×N connecting terminals 446 and an array of M×N levelling members 448. The passivation layer 320, made of, e.g., a phosphor-silicate glass (PSG) or silicon nitride, and having a thickness of 0.1–2 μm, is located on top of the active matrix 310.

The etchant stopping layer 330, made of silicon nitride, and having a thickness of 0.1–2 μm, is positioned on top of the passivation layer 320.

Each of the actuating structures 410 includes a first thin film electrode 385, a thin film electrodisplacive member 375, a second thin film electrode 365, an elastic member 355 and a conduit 395. The first thin film electrode 385 made of an electrically conducting and light reflecting material, e.g., aluminum (Al) or silver (Ag), is located on top of the thin film electrodisplacive member 375 and is electrically connected to the ground thereby functioning as a mirror as well as a common bias electrode. The thin film electrodisplacive member 375, made of a piezoelectric material, e.g., lead zirconium titanate (PZT), or an electrostrictive material, e.g., lead magnesium niobate (PMN), is placed on top of the second thin film electrode 365. The second thin film electrode 365, made of an electrically conducting material, e.g., platinum/tantalum (Pt/Ta), is located on top of the elastic member 355, is electrically connected to a corresponding transistor through the conduit 395 and the connecting terminal 446, and is disconnected electrically from the second thin film electrode 365 in other thin film actuated mirrors 301, thereby allowing it to function as a signal electrode. The elastic member 355, made of a nitride, e.g., silicon nitride, is positioned below the second thin film electrode 365. The conduit 395, made of a metal, e.g., tungsten (W), extends from top of the thin film electrodisplacive member 375 to top of the connecting terminal 446. The conduit 395 extending downward from top of the thin film electrodisplacive member 375 and the first thin film electrode 385 placed on top of the thin film electrodisplacive member 375 in each of the thin film actuated mirrors 301 are not electrically connected to each other. Each of the actuating structures 410 has a proximal end 420 and a distal end 425, the proximal end 420 being divided into a first and a second side portions 422, 424 wherein the first side portion 422 of the proximal end 420 is attached to top of the connecting terminal 446 in the active matrix 310 and the second side portion 424 of the proximal end 420 is attached to top of the levelling member 448 in the active matrix 310, with the etchant stopping 330 and the passivation layers 320 partially intervening therebetween, respectively, thereby cantilevering the actuating structure 410.

Figure 4A:
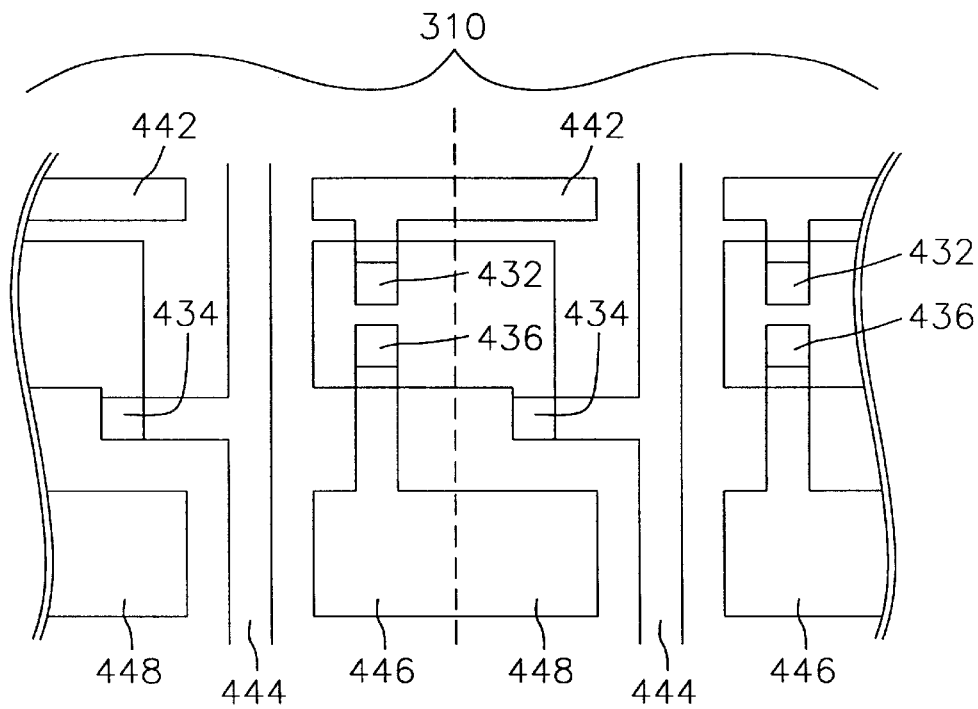
FIGS. 4A and 4B are top views of an active matrix in the array of M×N thin film actuated mirrors in accordance with two embodiments of the present invention.
Figure 4B:
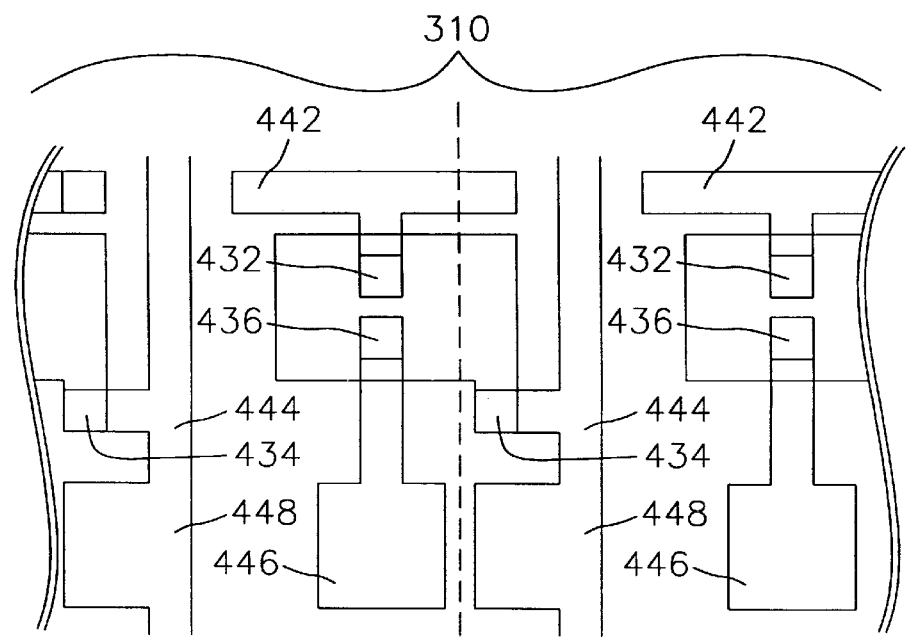

In FIGS. 4A and 4B, there are provided with top views of the active matrix 310 in the array 300 of M×N thin film actuated mirror 301 in accordance with two embodiments of the present invention.

Each of the transistors 430 has a source 432, a gate 434 and a drain terminals 436, each of the source terminals 432 positioned in the same column being electrically connected to each other as the source line 442, each of the gate terminals 434 positioned in the same row being electrically connected to each other as the gate line 444, and each of the drain terminals 436 being electrically connected to a corresponding connecting terminal 446. The source lines 442 are electrically disconnected to the gate lines 444. Each of the connecting terminals 446 is positioned below the first side portion 422 of the proximal end 420 in the thin film actuated mirrors 301 and each of the levelling members 448 is positioned below the second side portion 424 of the proximal end 420 in the thin film actuated mirror 301. The levelling member 448 is incorporated into the active matrix 310 in such a way that top of the levelling member 448 is identical to that of the connecting terminal 446. As shown in FIG. 4A, in accordance with one embodiment of the present invention, each of the levelling members 448 is formed by extending the connecting terminal 446 from the first side portion 422 of the proximal end 420 of the neighboring thin film actuated mirror 301 to the second side portion 424 of the proximal end 420 in the thin film actuated mirror 301. As shown in FIG. 4B, in accordance with another embodiment of the present invention, each of the levelling members 448 is formed in such a way that the gate line 444 is placed under the second side portion 424 of the proximal end 420 in the thin film actuated mirror 301.

In FIGS. 5A to 5J, there are schematic cross section views illustrating a method for the manufacturing an array 300 of the M×N thin film actuated mirrors 301 shown in FIG. 3.

Figure 5A:
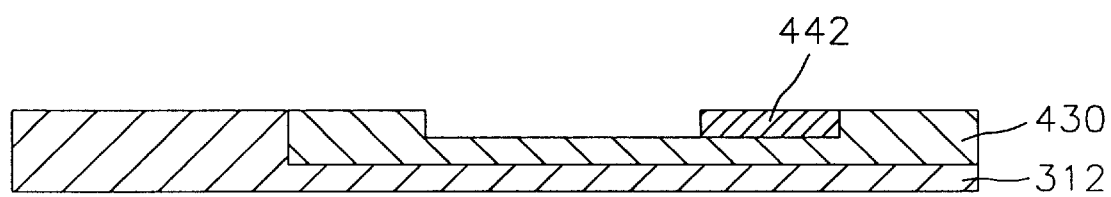
FIGS. 5A to 5J are schematic cross section views illustrating a method for manufacturing an array of M×N thin film actuated mirrors in accordance with the present invention.

The process for the manufacture of the array 300 begins with the preparation of a substrate 312 including an array of M×N MOS transistors 430 and M number of source lines 442. Each of the source terminals 432 positioned in the same column is electrically connected to each other through one of the source lines 442, as shown in FIGS. 4A, 4B and 5A.

Figure 5B:
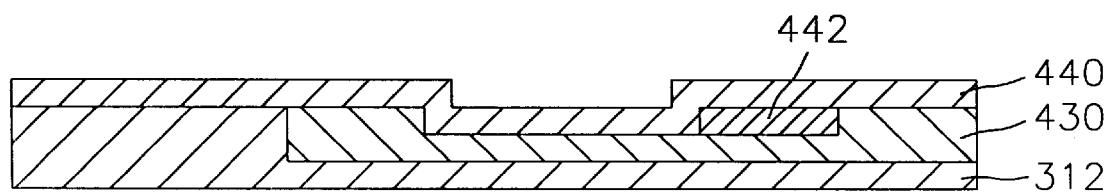

Subsequently, a metal layer 440 made of, e.g., tungsten (W), is deposited on top of the substrate 312 including the transistors 430 by using a sputtering method, as shown in FIG. 5B.

Figure 5C:
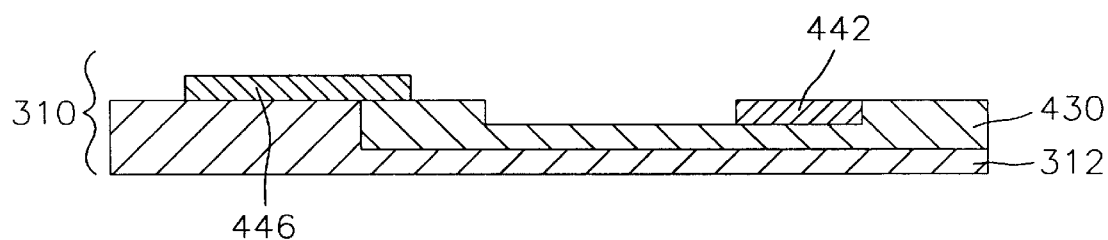

Next, the metal layer 440 is patterned into an array of N gate lines 444, an array of M×N connecting terminals 446 and an array of M×N levelling members 448 to thereby form a active matrix 310. Each of the gate terminals 434 positioned in the same row is electrically connected to each other through one of the gate lines 444. Each of the drain terminals 436 is electrically connected to a corresponding connecting terminal 446, as shown in FIGS. 4A, 4B and 5C.

In a subsequent step, there is formed a passivation layer 320, made of, e.g., PSG or silicon nitride, and having a thickness of 0.1–2 μm, on top of the active matrix 310 by using, e.g., a CVD or a spin coating method.

Figure 5D:
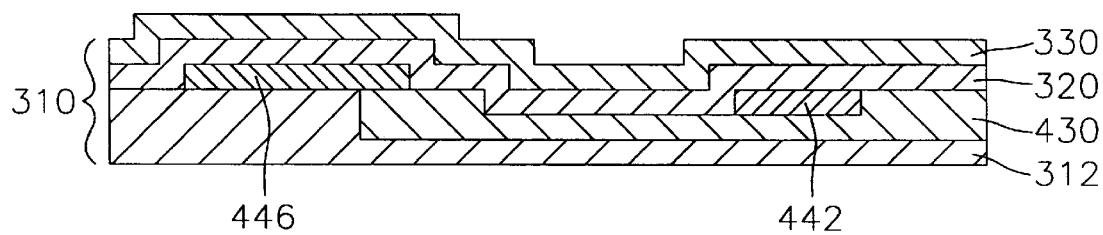

Thereafter, an etchant stopping layer 330, made of silicon nitride, and having a thickness of 0.1–2 μm, is deposited on top of the passivation layer 320 by using, e.g., a sputtering or a CVD method, as shown in FIG. 5D.

Then, a thin film sacrificial layer 340, made of, e.g., a PSG, and having a thickness of 0.5–2 μm, is formed on top of the etchant stopping layer 330 by using an Atmospheric Press Chemical Vapor Deposition (APCVD) method.

Figure 5E:
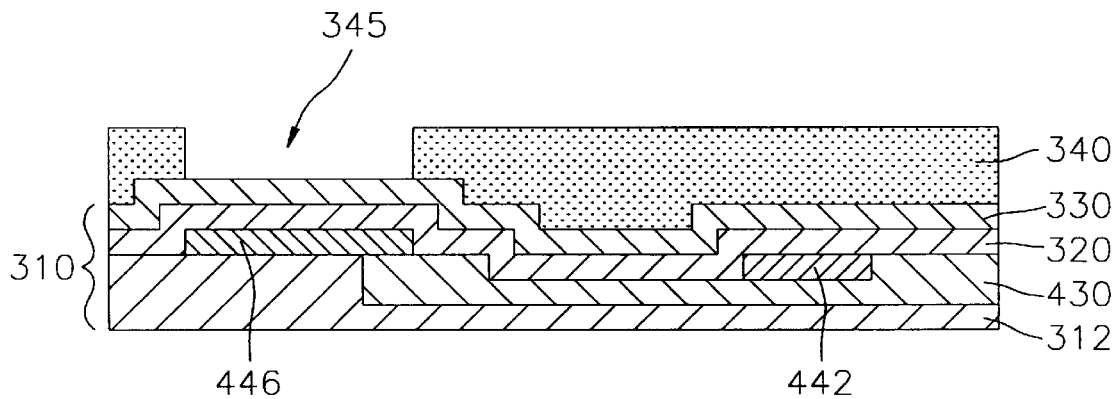

Subsequently, an array of M×N pair of empty cavities 345 is created in the thin film sacrificial layer 340 in such a way that one of the empty cavities 345 in each pair encompasses one of the connecting terminals 446 by using a dry or an wet etching method, as shown in FIG. 5E.

In a next step, an elastic layer 350, made of a nitride, e.g., silicon nitride, and having a thickness of 0.1–2 μm, is deposited on top of the thin film sacrificial layer 340 including the empty cavities 345 by using a CVD method.

Figure 5F:
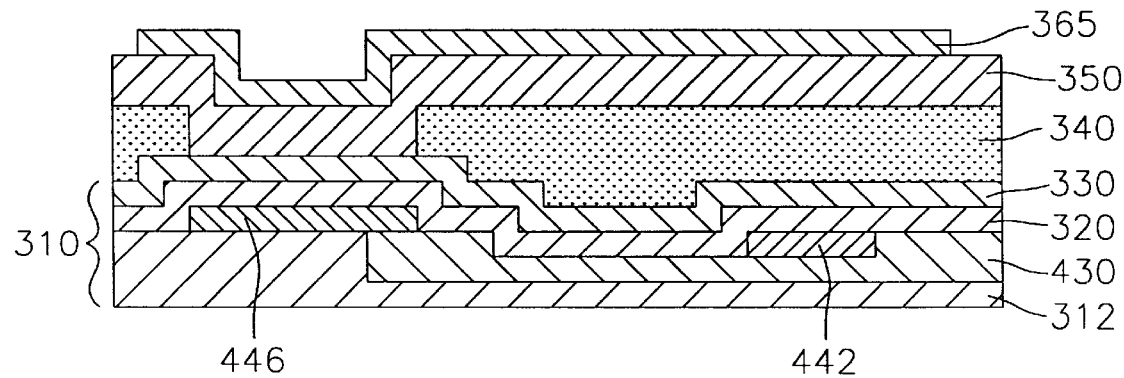

Thereafter, a second thin film layer (not shown), made of an electrically conducting material, e.g., Pt/Ta, and having a thickness of 0.1–2 μm, is formed on top of the elastic layer 350 by using a sputtering or a vacuum evaporation method. The second thin film layer is then iso-cut into an array of M×N second thin film electrodes 365 by using a dry etching method, wherein each of the second thin film electrodes 365 is electrically disconnected from other second thin film electrodes 365, as shown in FIG. 5F.

Then, a thin film electrodisplacive layer 370, made of a piezoelectric material, e.g., PZT, or an electrostrictive material, e.g., PMN, and having a thickness of 0.1–2 μm, is deposited on top of the array of M×N second thin film electrodes 365 by using an evaporation, a Sol-Gel, a sputtering or a CVD method.

Figure 5G:
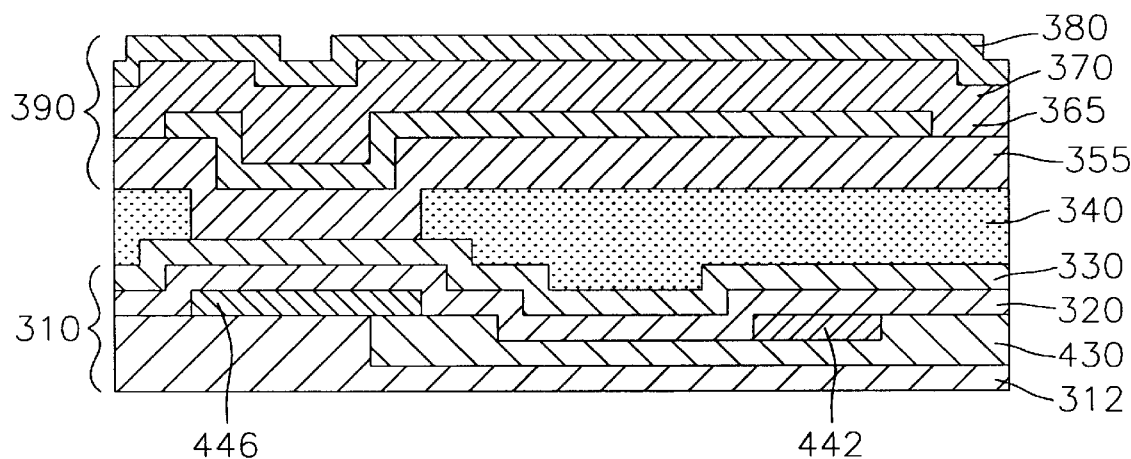

Subsequently, a first thin film layer 380, made of an electrically conducting and light reflecting material, e.g., aluminum (Al) or silver (Ag), and having a thickness of 0.1–2 μm, is formed on top of the thin film electrodisplacive layer 370 by using a sputtering or a vacuum evaporation method, thereby forming a multiple layered structure 390, as shown in FIG. 5G.

Figure 5H:
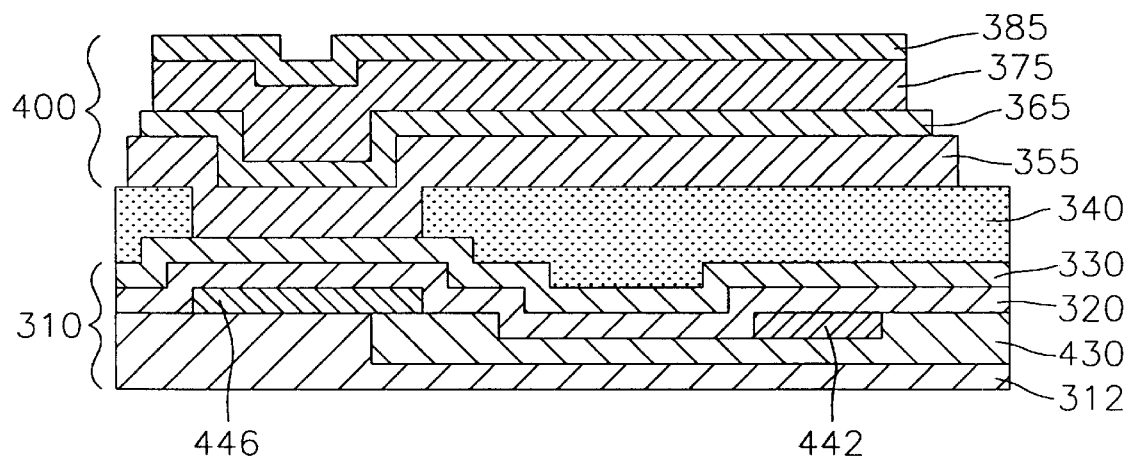

In an ensuing step, as shown in FIG. 5H, the multiple layered structure 390 is patterned into an array of M×N semifinished actuating structures 400 by using a photolithography or a laser trimming method, until the thin film sacrificial layer 340 is exposed. Each of the semifinished actuating structures 400 includes a first thin film electrode 385, a thin film electrodisplacive member 375, the second thin film electrode 365 and an elastic member 355.

In a subsequent step, an array of M×N holes (not shown) is created by using an etching method, wherein each of the holes extends from top of the thin film electrodisplacive member 375 to top of a corresponding connecting terminal 446.

Figure 5I:
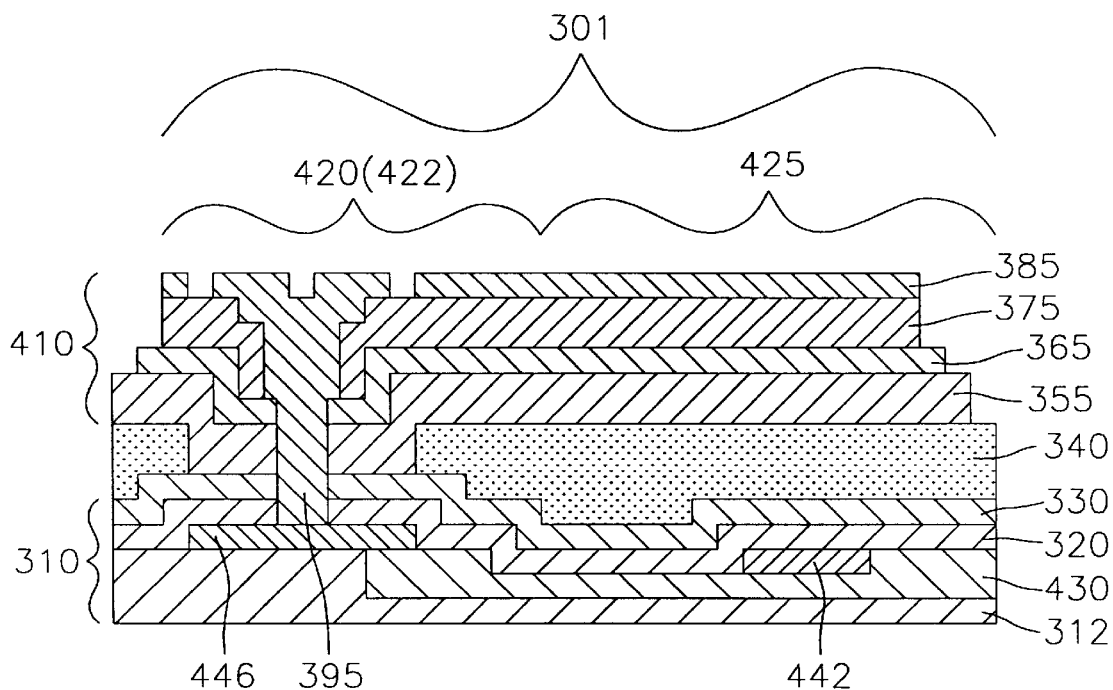

In a following step, the conduit 395 is formed by filling each of the holes with a metal, e.g., tungsten (W), using, e.g., a lift-off method, thereby forming an array of M×N actuating structures 410, as shown in FIG. 5I.

Figure 5J:
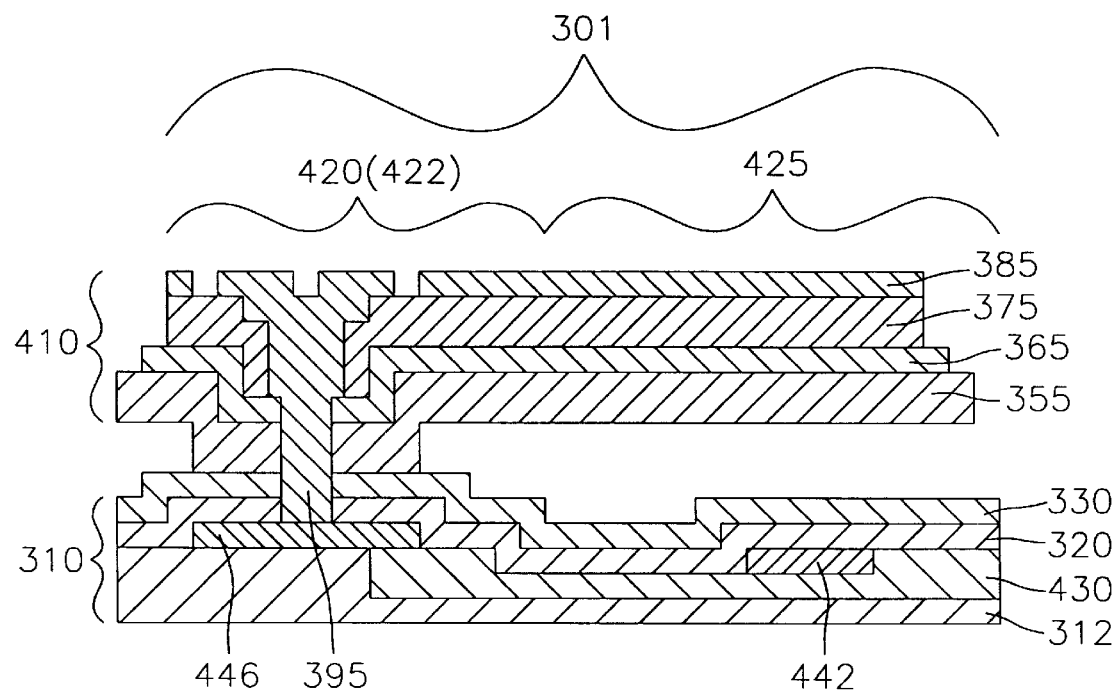

The thin film sacrificial layer 340 is then removed by using an wet etching method using an etchant or a chemical, e.g., hydrogen fluoride (HF) vapor to thereby form the array 300 of M×N thin film actuated mirrors 301, as shown in FIG. 5J.

In the inventive array 300 of M×N thin film actuated mirrors 301, the active matrix 310 includes an array of M×N connecting terminals 446 and an array of M×N levelling members 448. The connecting terminal 446 and the levelling member 448 are located below the first and the second side portions 422, 424 of the proximal end 420 in the thin film actuated mirrors 301, respectively, and the tops thereof are at a same level to each other to thereby allow the top of the first and second side portions 422, 424 of the proximal end 420 to be at a same level to each other.

While the present invention has been described with respect to certain preferred embodiments only, other modifications and variations may be made without departing from the spirit and scope of the present invention as set forth in the following claims.

What is claimed is:

1. An array of M×N thin film actuated mirrors, wherein M and N are integers, for use in an optical projection system, the array comprising:

an active matrix including a substrate, an array of M×N MOS transistors, M number of source lines, N number of gate lines, an array of M×N connecting terminals and an array of M×N levelling members;

a passivation layer formed on top of the active matrix;

an etchant stopping layer formed on top of the passivation layer; and an array of M×N actuating structures, each of actuating structures including a first electrode, an electrodisplacive member, a second electrode, an elastic member and a conduit, wherein the first electrode is located on top of the electrodisplacive member and is electrically connected to ground thereby functioning as a mirror as well as a common bias electrode, the electrodisplacive member is positioned on top of the second electrode, the second electrode is located on top of the elastic member and is electrically connected to a corresponding transistor through the conduit and the connecting terminal, thereby functioning as a signal electrode, the elastic member is positioned at bottom of the second electrode, and the conduit extends from top of the electrodisplacive member to top of the connecting terminal, and each of the actuating structures being provided with a proximal end and a distal end, the proximal end being divided into a first and a second side portions, the first side portion of the proximal end being located on top of the connecting terminal in the active matrix and the second side portion of the proximal end being located on top of the levelling member in the active matrix, with the etchant stopping layer and the passivation layer partially intervening therebetween, thereby cantilevering the actuating structure.

2. The array of claim 1, wherein each of the transistors is electrically connected to a corresponding connecting terminal.

3. The array of claim 1, wherein top of the levelling member is at a same level as that of the connecting terminal.

4. The array of claim 3, wherein each of the levelling members is formed by extending the connecting terminal from the first side portion of the proximal end in a neighboring thin film actuated mirror to the second side portion of the proximal end in the thin film actuated mirror.

5. The array of claim 3, wherein each of the levelling members is formed in such a way that the gate line is placed under the second side portion of the proximal end in the thin film actuated mirror.

6. A method for the manufacturing an array of M×N thin film actuated mirrors, wherein M and N are integers, for use in an optical projection system, the method comprising the steps of:

preparing a substrate including an array of M×N MOS transistors and M number of source lines;

depositing a metal layer on top of the substrate including the array of transistors;

patterning the metal layer into an array of M×N levelling members, an array of M×N connecting terminals and N number of gate lines, thereby forming an active matrix;

depositing a passivation layer and an etchant stopping layer on top of the active matrix, respectively;

forming a thin film sacrificial layer having an array of M×N pair of empty cavities on top of the etchant stopping layer;

depositing an elastic layer and a second thin film layer on top of the thin film sacrificial layer, respectively;

iso-cutting the second thin film layer into an array of M×N second film electrodes;

depositing a thin film electrodisplacive layer and a first thin film layer on top of the second thin film electrodes, respectively, thereby forming a multiple layered structure;

patterning the multiple layered structure into an array of M×N semifinished actuating structures, until the thin film sacrificial layer is exposed, each of semifinished actuating structures including a first thin film electrode, a thin film electrodisplacive member, a second thin film electrode, an elastic member;

forming an array of M×N conduits from top of the thin film electrodisplacive member to top of a corresponding connecting terminal thereby forming an array of M×N actuating structures;

removing the thin film sacrificial layer to thereby form an array of M×N thin film actuated mirrors.

7. The method of claim 6, wherein the metal layer is made of tungsten (W).

8. The method of claim 7, wherein the metal layer is deposited by using a sputtering method.

* * * * *